Nov. 17, 1931.  C. V. CARLSON  1,832,529
DEVICE FOR TRUING BRAKE DRUMS
Filed Sept. 8, 1930
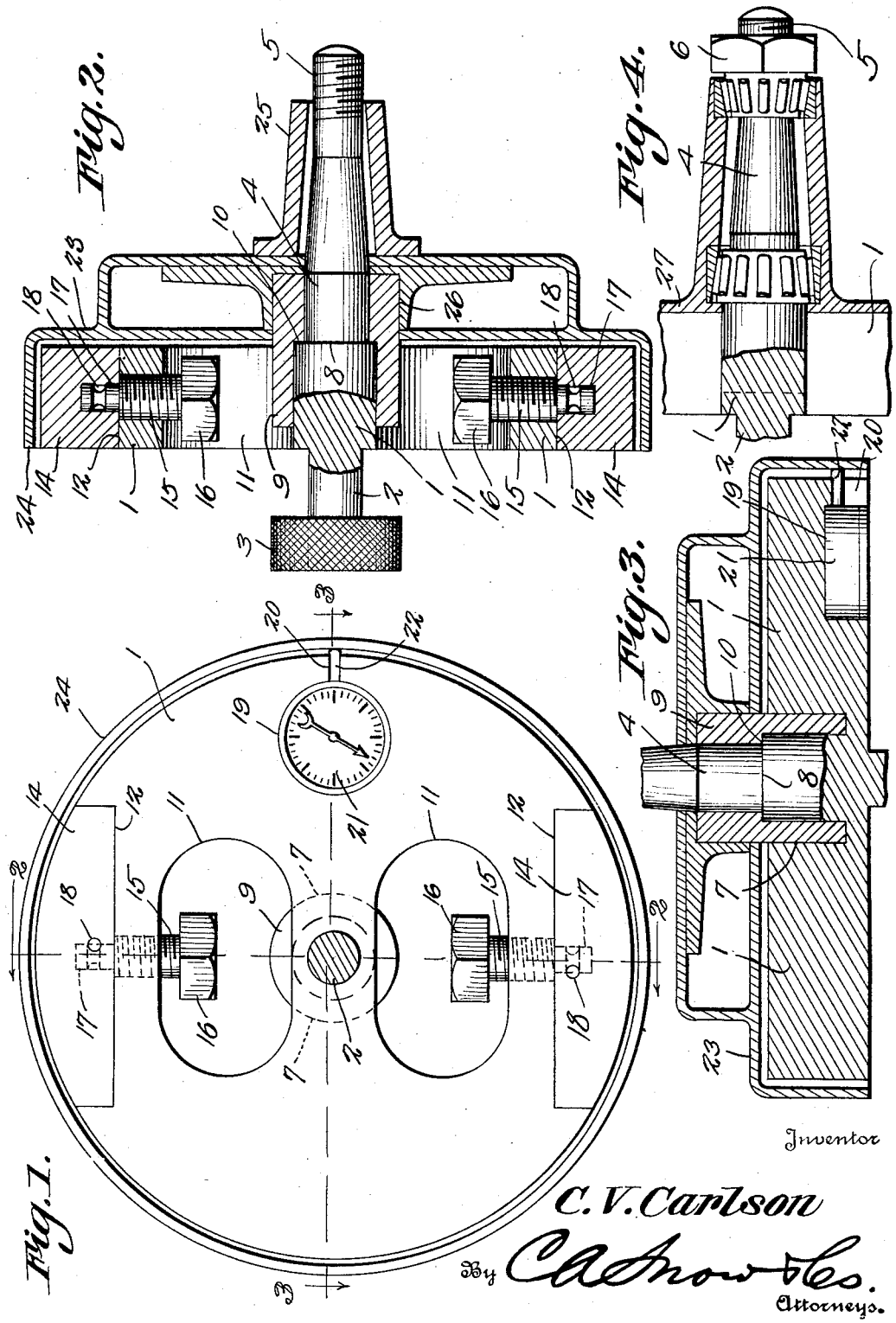
Inventor
C. V. Carlson
By C.A.Snow&Co.
Attorneys.

Patented Nov. 17, 1931

1,832,529

UNITED STATES PATENT OFFICE

CHARLES V. CARLSON, OF LOS ANGELES, CALIFORNIA

DEVICE FOR TRUING BRAKE DRUMS

Application filed September 8, 1930. Serial No. 480,489.

This invention aims to provide an improved and accurate means for truing brake drums, by the use of a micrometer which is a part of the device. A further object of the invention is to supply a tool of the class described provided with a spindle, or equivalent means, which, extending through the neck of the drum or through the wheel bearing, acts as a guide for the body portion of the device, thus eliminating all chance of error in straightening or truing drums. A further object of the invention is to provide a device of the class described which will operate on any and all pressed drums, and will true them to within a thousandth of an inch, without weakening the drum, it being unnecessary to cut, grind, or otherwise remove any portion of the constituent material of the rim of the drum.

It is within the province of the disclosure to improve generally, and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 shows in elevation, a device constructed in accordance with the invention, mounted within a rear brake drum, parts being in section;

Figure 2 is a section on the line 2—2 of Figure 1;

Figure 3 is a section on the line 3—3 of Figure 1;

Figure 4 is a sectional view illustrating how the device may be used in connection with a front wheel drum.

The device forming the subject matter of this application preferably is made of metal throughout. It includes a disk-like body 1 of circular outline. The body 1 is supplied at its center with a forwardly extended stem 2 carrying a turning handle or a knob 3 constituting means whereby the body 1 may be rotated.

The body 1 is supplied with a rearwardly extended spindle 4, which is threaded at its rear end, as shown at 5, to receive a nut 6. In the rear side of the body 1 there are oppositely disposed arcuate recesses 7, the spindle 4 extending between them. The spindle 4 has a shoulder 8 which is located near to the rear surface of the body 1, as Figure 3 will show.

A bushing 9 is slipped over the spindle 4, if the brake drum of a rear wheel is to be trued, as shown in Figures 1, 2 and 3 of the drawings, the forward end of the bushing 9 extending into the recesses 7. The bushing 9 is supplied with an internal shoulder 10 which abuts against the shoulder 8 of the spindle 4.

There are openings 11 through the body 1, on opposite sides of the stem 2. In its periphery, the body 1 has rectangular seats 12 in which correspondingly shaped shoes 14 are mounted to move inwardly and outwardly, in a radial direction, the outer edges of the shoes or expansion members 14 being curved, as shown in Figure 1.

An operating means for the shoes 14 is provided, and this means preferably takes the form of screws 15 threaded into the body 1, the screws having heads 16 which are located in the openings 11. The screws 15 have smooth reduced ends 17 which are journaled for rotation in the shoes 14, and are held therein at 18 for rotation.

In the forward side of the body 1, near to the edge thereof, there is a depression 19 with which communicates an outwardly extended slot 20. A micrometer 21 is secured in the depression 19 and includes a movable member 22, extended outwardly through the slot 20 and having a tendency to move outwardly in the direction of its length.

The numeral 23 marks a rear drum, including a rim 24 and a neck 25, the drum having an internal recess 26. The bushing 9 is received in the recess 26, the spindle 4 extends outwardly through the neck 25 of the drum, and the nut 6 is threaded on the end 5 of the spindle 4, as shown in Figure 4, although Figure 4 illustrates a slightly different application of the invention from the one now under consideration. The body 1 is located within the rim 24 of the brake drum 23.

Assuming that the parts are located as shown in Figures 1 and 2, the body 1 is rotated by means of the knob 3. The member 22 of the micrometer 21 rides on the inner surface of the rim 24 of the brake drum, and the micrometer 21 thereby is caused to show where the rim of the drum is out of true and how much it is out of true.

A wrench or the like, applied to the heads of the screws 15, may be used to rotate the screws, the screws forcing the shoes 14 outwardly, thereby shape those portions of the rim 24 which the micrometer 21—22 has shown to be out of condition.

In the event that the device is to be used in connection with a front wheel drum, as shown in Figure 4, the bushing 9 is taken off, there being no recess, like the recess 26 of Figure 2, in the front brake drum 27 of Figure 4.

The device is so constructed that it will indicate where the drum is out of shape and how much it is out of shape; thereafter, by the simple manipulation of the screws 16, the shoes may be brought into play to restore the rim of the drum to a true condition.

It is to be observed that no turning off of the rim 24 is required, in order to true it, and, consequently there is no loss of metal and no weakening of the rim of the drum.

Having thus described the invention, what is claimed is:

1. In a device of the class described, a body, means for mounting the body for rotation in a brake drum, outwardly acting measuring means at the edge of the body, and outwardly acting expansion means under the control of an operator and located at the said edge of the body.

2. In a device of the class described, a body, means for mounting the body for rotation in a brake drum, an outwardly acting micrometer at the edge of the body, an outwardly movable shoe at said edge of the body, and means under the control of an operator for actuating the shoe.

3. A device of the class described, a body, means for mounting the body for rotation in a brake drum, a shoe at the edge of the body, means under the control of an operator for moving the shoe in and out, and an indicating means at said edge of the body.

4. In a device of the class described, a body, a handle on the front side of the body, and constituting means whereby the body may be rotated, a spindle on the back side of the body and forming means whereby the body may be mounted for rotation in the brake drum, an indicating means carried at the edge of the body, and an expansion means carried at said edge of the body.

5. In a device of the class described, a body, means for rotating the body, a spindle carried by the body and constituting means whereby the body may be mounted for rotation, a bushing removably mounted on the spindle, an indicating means, located at the edge of the body, and an expansion mechanism operating at said edge of the body.

In testimony that I claim the foregoing as my own, I have hereto affixed my signature.

CHARLES V. CARLSON.